US010867337B2

(12) United States Patent
Tomkins et al.

(10) Patent No.: US 10,867,337 B2
(45) Date of Patent: Dec. 15, 2020

(54) CREATING SECURE SOCIAL APPLICATIONS WITH EXTENSIBLE TYPES

(71) Applicant: VERIZON MEDIA INC., New York, NY (US)

(72) Inventors: Andrew S. Tomkins, San Jose, CA (US); Cameron A. Marlow, New York, NY (US); Raghu Ramakrishnan, Los Altos, CA (US); Shanmugasundaram Ravikumar, Berkeley, CA (US)

(73) Assignee: VERIZON MEDIA INC., New York, NY (US)

( * ) Notice: Subject to any disclaimer, the term of this patent is extended or adjusted under 35 U.S.C. 154(b) by 33 days.

(21) Appl. No.: 15/439,132

(22) Filed: Feb. 22, 2017

(65) Prior Publication Data

US 2017/0161816 A1    Jun. 8, 2017

Related U.S. Application Data

(63) Continuation of application No. 12/615,986, filed on Nov. 10, 2009, now Pat. No. 9,600,800.

(60) Provisional application No. 61/174,392, filed on Apr. 30, 2009.

(51) Int. Cl.
*G06F 15/16* (2006.01)
*G06Q 30/06* (2012.01)
*G06F 16/951* (2019.01)
*G06Q 10/10* (2012.01)
*G06Q 30/02* (2012.01)
*G06Q 50/00* (2012.01)

(52) U.S. Cl.
CPC ....... *G06Q 30/0625* (2013.01); *G06F 16/951* (2019.01); *G06Q 10/10* (2013.01); *G06Q 30/0282* (2013.01); *G06Q 50/01* (2013.01)

(58) Field of Classification Search
CPC .......... G06Q 30/0625; G06Q 30/0282; G06Q 50/01; G06F 17/30864
USPC .............. 709/203, 204, 226; 726/3, 4, 9, 27; 715/237, 234, 764, 760; 707/784, 803, 707/721, 736
See application file for complete search history.

(56) References Cited

U.S. PATENT DOCUMENTS

| 7,949,611 | B1 | 5/2011 | Nielsen et al. |
| 9,582,597 | B2 * | 2/2017 | Weir ..................... G06F 16/335 |
| 2004/0107212 | A1 * | 6/2004 | Friedrich ............... G06F 16/25 |

(Continued)

*Primary Examiner* — Thuong Nguyen
(74) *Attorney, Agent, or Firm* — James J. De Carlo; Greenberg Traurig, LLP

(57) ABSTRACT

A social environment is provided by creating an object in response to recognition of an entity in a portion of web content, wherein the object represents the entity, the object is associated with a type selected from a set of types, and the type is associated with a schema selected from a set of schemas, where the social environment includes a set of objects including the object, wherein the objects are instances of corresponding types in a rich system of pre-defined types, the schemas are associated with the types, metadata is associated with the objects, and there is at least one relationship between at least two objects selected from the set of objects, where the set of objects and the metadata are extensible, such that extensions provided by a first user are available for use by a second user. In one example, metadata provided by a first user is only available to a second user having a relationship with the first user.

17 Claims, 7 Drawing Sheets

(56) References Cited

U.S. PATENT DOCUMENTS

| | | | |
|---|---|---|---|
| 2007/0112722 A1* | 5/2007 | Hikita | G06F 16/10 |
| 2007/0226064 A1* | 9/2007 | Yu | G06O 20/201 |
| | | | 705/20 |
| 2008/0086527 A1* | 4/2008 | Sposetti | G06Q 10/10 |
| | | | 709/204 |
| 2008/0148366 A1* | 6/2008 | Wahl | G06F 21/36 |
| | | | 726/4 |
| 2008/0189395 A1* | 8/2008 | Stremel | G06Q 50/01 |
| | | | 709/219 |
| 2009/0119764 A1* | 5/2009 | Applewhite | H04L 63/0853 |
| | | | 726/9 |
| 2009/0165091 A1* | 6/2009 | Liang | H04L 63/105 |
| | | | 726/3 |
| 2009/0245603 A1 | 10/2009 | Koruga et al. | |
| 2010/0005520 A1 | 1/2010 | Abbot et al. | |
| 2010/0030578 A1 | 2/2010 | Siddique et al. | |
| 2010/0030729 A1* | 2/2010 | Hsu | G06F 16/00 |
| | | | 707/721 |
| 2010/0042511 A1* | 2/2010 | Sundaresan | G06Q 10/10 |
| | | | 705/26.1 |
| 2010/0049731 A1* | 2/2010 | Kiran Vedula | G06Q 30/0641 |
| | | | 707/736 |
| 2010/0082774 A1* | 4/2010 | Pitts | H04N 21/222 |
| | | | 709/219 |
| 2010/0146118 A1 | 6/2010 | Wie | |
| 2010/0153862 A1* | 6/2010 | Schreiber | G06Q 30/0273 |
| | | | 715/760 |
| 2010/0191770 A1 | 7/2010 | Cho et al. | |
| 2010/0198888 A1* | 8/2010 | Blomstedt | G06F 16/40 |
| | | | 707/827 |
| 2010/0211741 A1* | 8/2010 | Soni | G06F 17/30557 |
| | | | 711/118 |
| 2010/0229243 A1* | 9/2010 | Lin | G06F 21/10 |
| | | | 726/27 |
| 2010/0250618 A1* | 9/2010 | Ourega | G06F 16/958 |
| | | | 707/803 |
| 2010/0257207 A1* | 10/2010 | Oe | G06F 16/9535 |
| | | | 707/784 |
| 2010/0293598 A1 | 11/2010 | Collart et al. | |
| 2011/0179118 A1 | 7/2011 | Dean et al. | |
| 2012/0036191 A1* | 2/2012 | Tiu, Jr. | G06F 17/30569 |
| | | | 709/204 |
| 2013/0215116 A1 | 8/2013 | Siddique et al. | |
| 2014/0195543 A1* | 7/2014 | Stefik | G06N 5/022 |
| | | | 707/741 |

* cited by examiner

CREATING SECURE SOCIAL APPLICATIONS WITH EXTENSIBLE TYPES

CROSS-REFERENCE TO RELATED APPLICATIONS

This application is a continuation of co-pending U.S. non-provisional application Ser. No. 12/615,986, filed Nov. 10, 2009, and entitled "CREATING SECURE SOCIAL APPLICATIONS WITH EXTENSIBLE TYPES," which claims benefit to provisional application U.S. Ser. No. 61/174,392, filed Apr. 30, 2009, each of which is hereby incorporated by reference in its entirety for all purposes.

BACKGROUND

1. Field

The present application relates generally to computer-based systems and applications, and more specifically to online social networking.

2. Related Art

The use of computer-implemented objects to represent items on the World Wide Web is known in the art. An object may represent a real-world item and may have attributes, e.g., associated values, which describe the item. For example, each item for sale on an auction site such as eBay® may be represented by an object having attributes such as name, price, seller, and the like. As another example, each type of item for sale on an online shopping site, such as Amazon.com®, may be represented by an object having attributes such as name, price, quantity in stock, customer rating, and the like. As yet another example, each person on a social networking web site may be represented as an object having attributes such as name, email address, interests, location, and friends.

Each object may be unconstrained by a type, or may be an instance of a type that specifies the particular attributes that are associated with objects of the type. Such type information may include a "schema" that, in one aspect, defines a template for the attributes of the type. The schema may be, for example, a list of attribute names and corresponding attribute types. The attribute types may be omitted, in which case the attributes may be represented as string values, or other types of values, and the attributes may all have the same type, or no specific type. For example, an auction listing type may be associated with a schema specifying that a name, price, and seller are to be associated with each object of the auction listing type. The schema may specify types for the name, price, and seller attributes, e.g., string, numeric, and string, respectively. If the schema does not specify types for the attributes, the attributes may be represented as, for example, string values. The schema may be used, for example, in displaying the object and collecting information about the object. The schema may also be used for data validation purposes, e.g., to verify that the necessary attributes are filled in and used for each object of the type. Existing online services allow users to create and modify objects, e.g., items for sale on eBay, or reviews on Yelp®.

SUMMARY

The World Wide Web is evolving into a dynamic repository of information on virtually every topic, including people, and their connections to each other and to online content. Such online content is represented as structured data, which allows users to create, reference, annotate, and interact with objects in a web-site-independent manner to create semantically rich content. Structured data is increasingly the focus of consumption by users, as more and more aspects of daily life migrate online. Exemplary types of structured data include information about entities such as restaurants, products, songs, videos, finance, user profiles, social networks, and the like.

In one example, a method of providing a social environment includes creating an object in response to recognition of an entity in a portion of web content, wherein the object represents the entity, and the web content is presentable to a first user of a web browser. The method further includes associating metadata with the object and with the first user, wherein the metadata is visible to a second user if the second user has a relationship with the first user, and the metadata is not visible to the second user if the second user does not have a relationship with the first user.

For instance, an object may be created in a portion of web content, wherein the object represents the entity, and the web content is presentable to a first user of a web browser. Metadata may be associated with the object and with the first user, wherein the metadata is visible to a second user if the second user has a relationship with the first user. The second user may be determined to have a relationship with the first user if the second user is a friend of the first user in the social environment, member of a common group (e.g., company, school, family, interest group or the like), and so on. The metadata may include ratings, tags, text, and attention data, or a combination thereof.

The object may include or represent a person, place, or thing. The entity may include a first text string, and the web content may include a second text string, and recognition of the entity may occur in response to the first text string matching at least a portion of the second text string.

In one example, the method further includes searching the web content for a reference to the object in response to receipt of the content by the web browser, and causing display of supplemental information in the web browser in response to the reference to the object being present in the content, wherein the supplemental information is based upon metadata associated with the object, and the supplemental information is associated with the object in the web browser. The reference to the object may include a name of the object, an identifier associated with the object, or a combination thereof. Further, the object may include an instance of a corresponding type in a rich system of pre-defined types, and the object and the metadata may be extensible, such that extensions provided by a first user via a first computer are available for use by a second user via a second computer.

Additionally, in other aspects of the present invention, apparatuses, systems, interfaces, and computer readable storage media having computer readable instructions are provided for providing a social environment as described herein.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1:
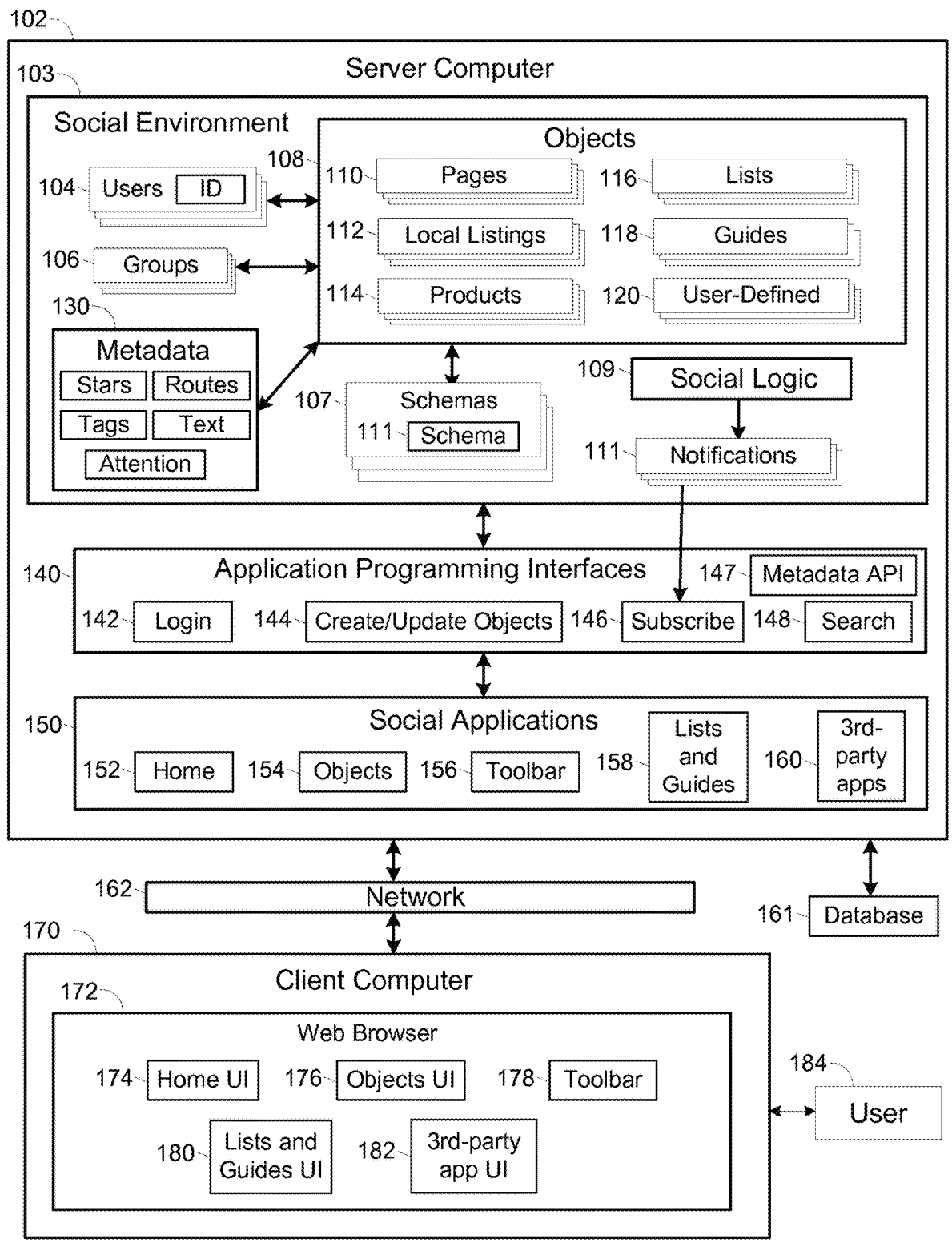
FIG. 1 illustrates a social networking environment in accordance with embodiments of the invention.

FIG. 1 illustrates a social networking environment in accordance with embodiments of the invention. A server computer 102 communicates with a client computer 170 via a network 152, e.g., the Internet or some other communications network. A user 184 interacts with a web browser 172 or other client application running on the client computer 170 to view and create information stored on one or more server computers, such as the server 102, which may communicate with each other and/or with the client computer 170 via the network 152. A social environment 103, which may be, for example, computer program code, including objects 108 implemented in a programming language such as Java®, Python®, C++, or the like, and associated data stored in a database 161, e.g., a relational database such as Oracle® or the like, monitors information received from the user 184 and creates objects 108 that represent information relevant to the user 184 and other users. Each of the objects 108 may represent a physical or virtual object, such as a place, a web page, or other content. The objects 108 may also represent, in some examples, a kind of physical object, such as a particular make and model of a car.

Each object includes one or more attributes, which are, for example, name-value pairs, e.g., "price=500", where price is the name and 500 is the value. Users may modify the values of the attributes (e.g., by setting the value of the "price" attribute to 600) and add additional attributes as long as the attributes conform to the schema.

A "type" has a name and is associated with a schema that includes one or more attribute names. Each of the objects 108 is an instance of a type that associates the object with a schema 111 selected from a set of schemas 107. For example, objects 108 that represent cameras may be associated with, i.e., instances of, a "camera" type. The camera type has a camera schema 111, which has three elements: model_name, manufacturer, and price. An exemplary object that represents a camera includes the values D60, Nikon, and $999, respectively. This object is an instance of the camera type, which associates the object with the camera schema. Types may be understood as templates for objects, and schema elements may be understood as attributes without particular values, i.e., templates for attributes. Schema elements may be associated with default values. Each element may have an associated type, e.g., string, integer, floating-point, or a type schema-based type. Schemas may also be identified by, for example, global names that are meant to be globally-unique across the Web. A schema may be used, for example, to prompt users for attribute values, and may also be used to validate objects 108 to ensure that the attributes conform to the schema.

Constraints may be placed on the attributes by a schema associated with the object. An object's schema specifies one or more attributes that may be associated with the object. Schemas may have derived from existing schemas to produce derived schemas that add additional attributes to the existing schemas. For example, a derived schema "digital_camera" derived from the schema "camera" may add a "megapixels" element to the camera schema, so that the digital camera schema includes the attributes model_name, manufacturer, price, and megapixels.

Although the schema and values that have been used to populate the schema are a kind of metadata, the term "metadata" as used herein refers to particular kinds of information that may be associated with most types of objects. The term metadata as used herein refers to information about objects, and includes ratings, tags, attention information, text, and the like. This metadata may have a schema, which may be associated with a base object type from which most object types are derived (i.e., extended), so that the particular metadata schema, e.g., a rating schema, is shared by most object types. Thus schemas for metadata are extensible by users in the same way that schemas of other types of objects are extensible. In one example, the schemas and metadata are available to other users having a relationship with the user associating the metadata with objects.

With a global object model in place, it becomes possible to associate certain types of metadata with most or all objects. On today's web, there are at least four metadata types that apply broadly to object types, as follows. One type is a rating, e.g., three stars, thumbs up, and related forms of positive or negative feedback on a piece of content. Another type is a tag, which is, for example, a short textual word or phrase associated with an object to support retrieval or sharing. Another type of metadata is user attention data, which indicates that, for example, a particular user viewed an object, clicked on it, or interacted with it so as to imply some level of satisfaction or interest. Another type of metadata is text, such as a review, comment, or other piece of textual information associated with the object.

In one example, users may update, i.e., change or extend, schemas of objects. In particular, users may update the schema of an object, the attribute values of an object, or both. A user interface provides graphical tools for creating and extending types by defining schemas, copying schemas to produce new schemas, and modifying schemas by adding or removing attributes. The user interface shows a list of existing types, and a user may select an existing type to subclass by adding new attributes. Users can create new types and make those types available for use by other users.

The objects 108 may include representations of users 104, groups 106 of users, web pages 110, local listings 112, products 114, lists 116, guides 18, and user-defined objects 120. In one example, the groups 106 may be groups of objects 108 or groups of users 104. Each of the groups 106 may include multiple users 104 or objects 108, and may translate requests and operations on the group to corresponding requests and operations on each of the users or objects in the group. The local listings 112 may include, for example, names, addresses, ratings, and reviews of businesses, such as restaurants, events, and attractions in a geographical region. The products 114 may include, for example, names, descriptions, prices, ratings, and reviews of products, such as digital cameras. The lists 116 may be, for example, lists created by users that list other objects, such as a list of favorite restaurants, or a list of digital camera accessories. The guides 118 may be, for example, descriptions of a topic that reference other objects, such as a guide to places of interest in a city, or a guide to books written by an author. The user-defined objects 120 may be objects that represent any type of entity, where the objects 120 are associated with schemas 107 defined by users.

In one example, the social environment 103 also includes social logic 109, e.g., computer program code, which processes requests from application programming interfaces 140 and provides the operations necessary to implement the application programming interfaces 140 by, for example, creating, updating, and retrieving the objects 108. The social logic 109 may also generate notifications 121 that are delivered and/or displayed to users in response to such creating, updating, retrieving, and other operations for which users may desire to receive notification.

The social environment 103 provides the objects, users 104, groups 106, and metadata 130 to application programming interfaces 140 ("API's"). The API's 140 may be used by application programs, such as social application 150, to access the objects, users, groups, and metadata. The social applications 150 are shown on the server computer 102 in this example, but in other examples may be located on other computers, such as the client computer 170, and may communicate with the social environment through the network 162 using, for example remote procedure calls (RPC). In another example, the API 140 may be located on other computers, e.g., co-located with the social applications 150 on another computer, and the API 140 may use RPC to communicate with the social environment 103. In other examples, the components of the social environment may be distributed among multiple computers.

The metadata 130 includes information about the objects 108. In one example, the metadata 130 is provided by or based upon actions of the users 104. The metadata 130 may include, for example, ratings (e.g., number of stars), tags, attention (e.g., number of clicks on an object), text (e.g., a review or comment), and routes (e.g., a route between two places).

In one example, the API's 140 include a login API 142 for processing user name and passwords to authenticate a user, a Create/Update objects API 144 for processing requests to create, update, and delete objects, a subscribe interface 146 for creating vitality streams that provide notifications 111 of events and operations on objects, and a search API 148 that provides a search feature for searching the objects 108, users 104, groups 106, and metadata 120 for information specified in a search query. The social applications 150 include a Home application 152, an Objects application 154, a Toolbar 156, a Lists and Guides application 158, and Third-party applications 160. The API's 140 and social applications 150 are not limited to the particular examples shown here. For example, a user may create additional social applications 150 by writing program code that invokes the API's 140 to provide features not described herein.

On the client computer 170, a web browser 172 (or other application) executes and interacts with the user 184 via user interfaces that are, for example, computer program code that displays and receives information to and from the user 184 using a display device and an input device, respectively, of the client computer 170. In one example, the user interface code and associated data necessary for presenting the user interfaces, are provided by the server computer 102 to the client computer 170 via the network 162. The user interface code is executed by the client computer 170 when, for example, the user 184 request the user interface(s) or visits a web page that includes the interface(s). In the example of FIG. 1, the web browser or application 172 may provide a Home user interface 174 for the home application 152, an Objects user interface 176 for the objects application 154, a toolbar user interface 178, for the toolbar application 156, a Lists and Guides user interface 180 for the Lists and Guides application 158, and a third-party application user interface 182 for the third-party applications 160. The user interfaces receive information from the user as needed by the corresponding application, and display information generated by the corresponding application.

In one example, a social environment may be created by creating a set of objects in response to recognition of an entity in a portion of web content, wherein the objects represent the entity, the objects are associated with corresponding types selected from a set of types, and the types are associated with corresponding schemas selected from a set of schemas. The social environment includes the set of objects that are instances of corresponding types in a rich system of predefined types. A set of schemas is associated with the set of types, metadata associated with the set of objects, and at least one relationship between at least two objects selected from the set of objects. The set of objects and the metadata are extensible, such that extensions provided by a first user are available for use by a second user. In one aspect, a first type is an extension of a second type if the second type includes all attributes of the first type. An extended type such as the second type may be substituted for the first type in operations that accept the first type. The extended types are referred to herein as subtypes. Subtypes create a type hierarchy as known to those skilled in the art.

In one example, the object types are members of a rich system of predefined types. A rich system of predefined types is, for example, a set of types that represent entities in particular subject domains, which are also known as "vertical domains". Examples of vertical domains include particular industries, e.g., finance, energy, transportation, and the like, and more specific subjects within those industries, e.g., banking, oil, and air cargo, respectively. The entities in a domain may be any objects of use in modeling activities or data in that domain, e.g., bank account entities in a banking domain might by represented by a Bank Account type that has a schema with attributes for an account name and an account balance. Users may create objects that are instances of the Bank Account, e.g., a particular user's bank account. Users may also create subtypes of the Bank Account type, e.g., a Checking Account type that extends the Bank Account type and adds attributes specific to checking account to a schema associated with the Checking Account type, e.g., lists of pending and paid checks.

A global name may be associated with an object. A global name may enhance the social interactions that can be achieved by multiple users creating and enhancing meaningful descriptions of these objects. An object may be referred to by a URL, e.g., the URL of a digital camera, but it is considerably more difficult to refer to a digital camera in a way that is common across different web sites. A camera, like many of the objects we wish to interact with online, is not ordinarily a first-class object in today's web. Even if a human correctly interprets a URL object reference, a web search is unlikely to generate all existing references (e.g., all discussions, reviews, and pricing) to the underlying object. The same is true for other types of objects, such as movies, restaurants, and people. With a canonical reference scheme for certain key types of objects, new capabilities would be enabled. For example, a camera object may be referred to by the canonical reference http://biz.yahoo.com/e/070228/ebay10-k.html.

Objects can aggregate metadata and consumption patterns from across the web. Objects can expose web service calls providing information necessary to display the object on a page in a remote website, and remote applications can benefit from the presence of a repository of structured data. If the display information contains capabilities allowing users viewing the display to potentially contribute ancillary metadata (reviews, ratings, etc) back into the repository, then an ecosystem may merge around the universe of objects. Once the simple objects are in place, it becomes easier to create richer compound objects with embedded references to other objects. A compound object may be as simple as an event object that contains references to a venue, or as sophisticated as a guidebook capturing the HDTV market, with embedded references to relevant models, manufacturers, and distributors.

While individual users may benefit from accessing information about an object, and may in some cases be willing to contribute related information back to the object repository, there are other use cases in which an entire community comes together around a set of objects. This could be an auto enthusiast community referencing object of type vehicle, or a community around tech gizmos, or a community of geographically proximate users who like restaurants.

In one example, a group may be defined that includes multiple objects, wherein a reference to the group refers to all objects in the group. The group may represent a buddy list and/or a list of people in a social network. In another example, a compound object may be defined that includes multiple objects. The compound object may be a list of objects. The list may represent, for example, a walking tour, a how-to guide, and the like.

In one example, a "vitality stream" of notification messages may be generated for events or operations objects and/or users. The notification may represent, for example, creation of an object, update of an object, deletion of an object, and/or a news item. Events related to an object may be delivered to at least one user in response to receiving a subscription request from the user, where the subscription request includes a subscription condition. If the subscription condition is satisfied for a particular event, then that event is to be delivered to each user who subscribed to the event. A subscription processor is created for delivering the at least one event to the receiver in response to the at least one event satisfying the subscription condition and the entitlement condition. The receiver may be, for example, a user. The receiver may be a group, and the subscription processor may deliver the event to a user, where the user is a member of the group.

Content may be searched for a reference to an object in response to receipt of the content by the Web browser. Supplemental information may then be displayed for the object in response to the reference to the object being present in the content, where the supplemental information is based upon metadata associated with the object. The reference to the object may include a name of the object and/or an identifier associated with the object. The object may represent a person, place, or thing. The metadata may include ratings, reviews, and/or supplemental text. The searching may be implemented by a browser toolbar that invokes an external search engine.

User-provided information may be associated with at least one object that corresponds to content displayed in a Web browser by receiving selection of a reference to an object, where the reference is displayed in the content, receiving metadata for the object from a user, and associating the metadata with the object. This association method may be implemented by a browser toolbar.

A portable social environment may be implemented by providing to a remote application an interface for accessing objects and groups of objects associated with a user identifier, where the interface includes operations for searching, retrieving, and updating the objects and the groups of objects via network requests, the interface is able to receive the user identifier from the remote application, and the interface is also able to control access to the objects and the groups of objects associated with the user identifier in accordance with an access control rule, and the interface enables a third party to access the objects and group of objects. The interface may provide notification events. The access control rule may grant access to at least one user-specified object. The access control rule may grant access to a user-specified object to a user-specified second user and/or group. The network requests may be, for example, TCP/IP messages and/or HTTP requests.

An interface for creating, updating, and searching for objects in a social environment may include a search component for receiving a search string, performing a search operation, and displaying results of the search operation; a create object component for creating a new object based upon user input, an update object component for updating an existing object based upon user input, and a metadata component for associating metadata with an existing object based upon user input.

Figure 2:
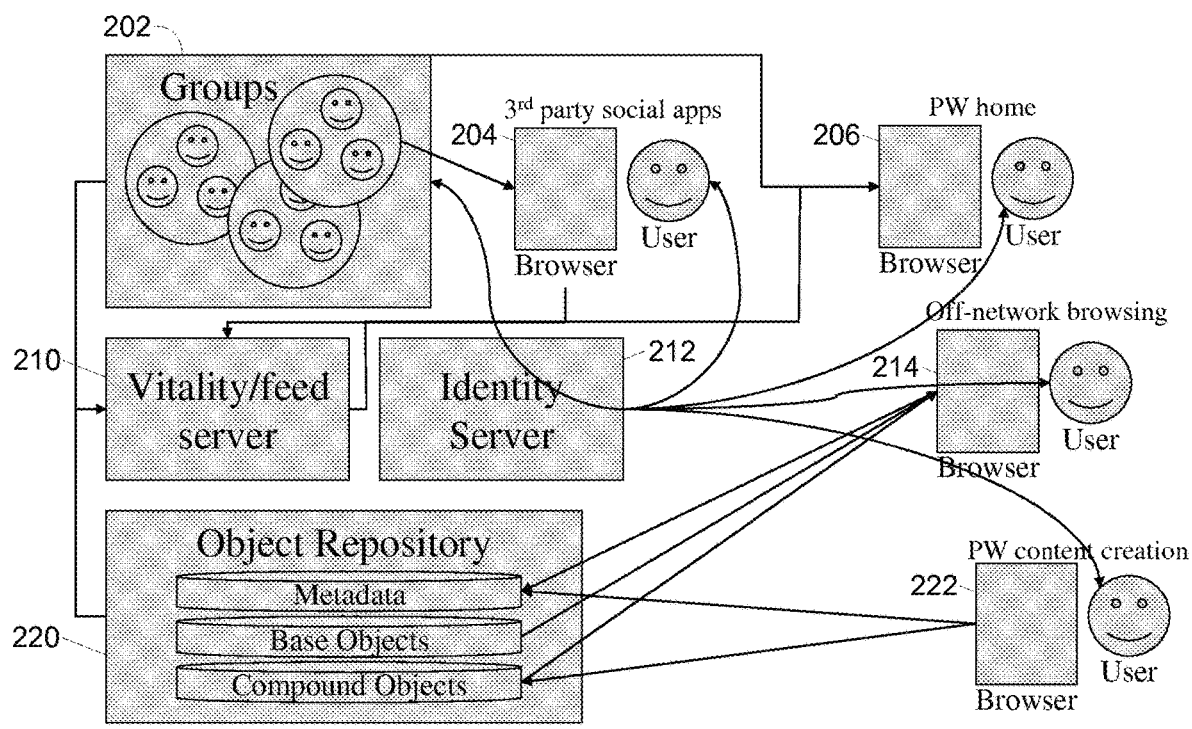
FIG. 2 illustrates data access by multiple users in accordance with embodiments of the invention.

FIG. 2 illustrates data access by multiple users of a social networking environment in accordance with embodiments of the invention. Browsers 204, 206, 214, 222, which may be, for example, web browsers such as Mozilla® Firefox®, Microsoft® Internet Explorer®, or the like, access the social networking environment via a network, e.g., the Internet.

The metadata stored in the object repository 220 is made available to multiple users, including the users associated with the browsers 204, 206, 214, and 222 (in one example, metadata associated with an object by a first user is available only to other users having a relationship with the first user). The social networking system shown in FIG. 2 includes groups 202, which are collections of user objects, a browser 204, e.g., a Web browser, for user interaction, a vitality/feed server 210, for generating notifications of changes to data stored in the object repository 220, an identity server for storing user identification information, and remote browsers 206, 214, 222 through which users may browse the objects, receive notifications, and create content to be stored in the repository, such as objects, schemas, and metadata.

Multiple different users may add attributes to a schema, and the added attributes appear for use by other users. In one example, users are prevented from removing attributes from schemas, so that schemas remain backward compatible. For example, if a first user named "A" creates the camera schema introduced above, the camera schema will be stored in the object repository 220. A second user "B" may then retrieve the camera schema from the object repository 220, e.g., by name, or by receiving a reference to the schema from the first user. The camera schema has three attributes (model_name, manufacturer, and price) and those three attributes are "visible", i.e., accessible, to both users. The attributes may have associated data types, e.g., string, string, and integer, respectively, in the camera example. The first user may create an object as an instance of the camera schema. For example, the first user may create an object named CasioExilim with the attributes model_name=Exilim, manufacturer=Casio, and price=199.95. The CasioExilim object is stored in the object repository 220 and is visible to the second user upon completion of the store operation. The second user may retrieve the CasioExilim object via a search, e.g., by searching for objects that contain the string "Casio". The second user may also receive the CasioExilim object from another user, or may receive the object in a notification. For example, the second user may subscribe to notifications about objects being created, and the notifications that the second user receives may be constrained to notifications that include the word "Casio".

In one example, different users may add attributes or metadata to a schema, and the added attributes or metadata only appear or are visible to other users having a relationship or associated with the user adding the attribute or metadata. For instance, an object may be created in a portion of web content, wherein the object represents the entity, and the web content is presentable to a first user of a web browser. Metadata may be associated with the object and with the first user, wherein the metadata is visible to a second user only if the second user has a relationship with the first user and not visible to the second user if the second user does not have a relationship with the first user. The second user may be determined to have a relationship with the first user if the second user is a friend of the first user in the social environment, member of a common group (e.g., company, school, family, interest group or the like).

A user may extend a schema, and the changes, e.g., a new schema that extends the original schema, are visible to all users. For example, if user B creates a new schema named digital_camera, and adds a "megapixels" attribute to the schema (e.g., of type integer), then the digital_camera schema is stored in the object repository 220 and made available to other users. Other users may retrieve or be notified of the existence of the digital_camera schema as described above for the camera schema. For example, user A may search for camera schemas (e.g., containing the string "camera") or for camera objects. A search for camera schemas will return the camera and digital_camera schemas. A search for camera objects, e.g., objects that are instances of the camera schema, will return any objects that use the camera or digital_camera schema as their schema. For example, if user A retrieves the digital_camera schema from the object repository 220, and creates an instance named CanonElph, with the megapixels attribute set to 12, then the CanonElph object will be stored in the object repository 220, where it may be retrieved by other users, such as user A. User A, or another user, may then extend the camera schema by adding more attributes, and may also extend the digital_camera schema by adding more attributes. Objects that are instances of a previous version of a schema have empty or undefined values for attributes that were added after the schema was created. In one example, a version number is associated with each version of a schema, and each object includes the version number of the schema from which the object was created. The version numbers may optionally be used to enable modifications of schemas beyond addition of attributes (e.g., to enable deletion and modification of attributes), in which case an object uses only the schema version for which the object is created, or a derived schema that is compatible (i.e., has no changed or removed attributes) with the schema version for which the object is created.

FIGS. 3A-3D illustrate user interfaces in accordance with embodiments of the invention. The home interface 302 of FIG. 3A may be displayed in, for example, a web browser. An interface 302 for providing information about objects in a social environment may include a notification (also known as "vitality") display component 304 for displaying at least one notification message 310, a groups component 306 for displaying at least one existing group, e.g., a group of users, wherein the groups component 306 creates at least one new group in response to user selection of a create group component (not shown). The home interface 302 also includes a content display component 308 for displaying content claimed by a user, where the content claimed by the user comprises one or more data sources and/or one or more messages (not shown). The data sources may include a web site on which the user posts content, and the messages may include content posted on a web site by the user.

Figure 3A:
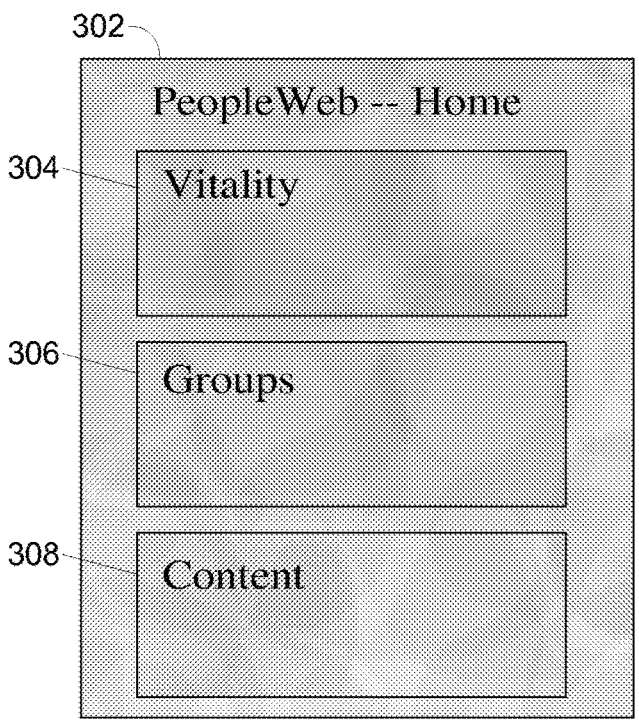
FIGS. 3A-3D illustrate user interfaces in accordance with embodiments of the invention.
Figure 3B:
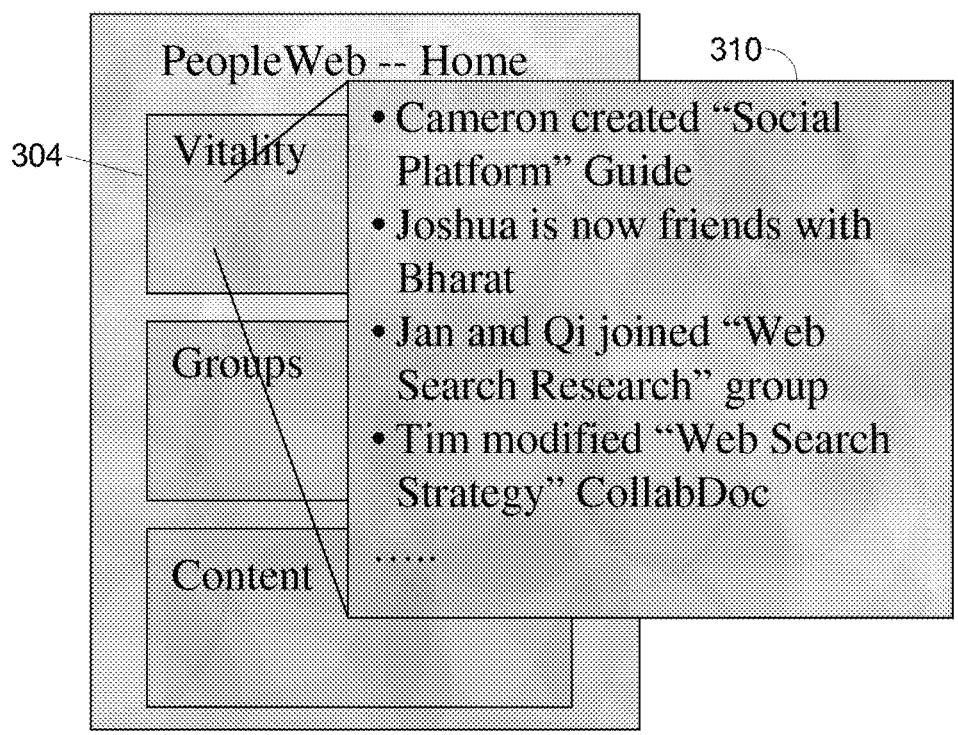

FIG. 3B shows notification messages 310 in accordance with embodiments of the invention. The notification messages 310 are displayed in the vitality display component 304 and describe events related to objects. The notifications 310 are displayed soon after an event related to an object occurs. The events may be, for example, creation of an object, e.g., "Cameron created Social Platform Guide", modification of an object, e.g., "Tim modified Web Search Strategy CollabDoc," invocation of a method (i.e., function) of an object, deletion of an object, creation or deletion of a link between object, e.g., "Joshua is now friends with Bharat," and the like.

Figure 3C:
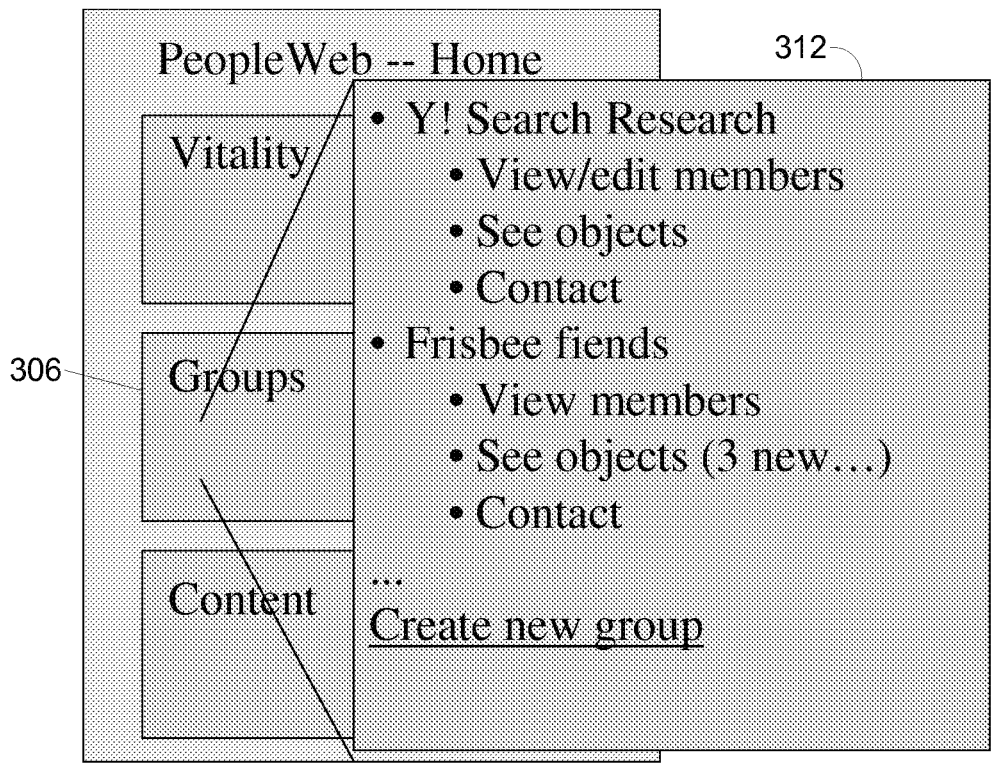

FIG. 3C illustrates a groups user interface 312 in accordance with embodiments of the invention. The groups user interface 312 is displayed in the groups display component 306. The groups user interface 312 displays the names of existing groups, e.g., Y! Search Research and Frisbee fiends in this example, and provides commands that users may invoke (e.g., by a mouse click on a corresponding link or component in the web browser) to view and edit group members, view objects related to the group, and to contact members of the group, e.g., by sending a message to the members of the group. The groups user interface 312 also provides a command for creating a new group.

Figure 3D:
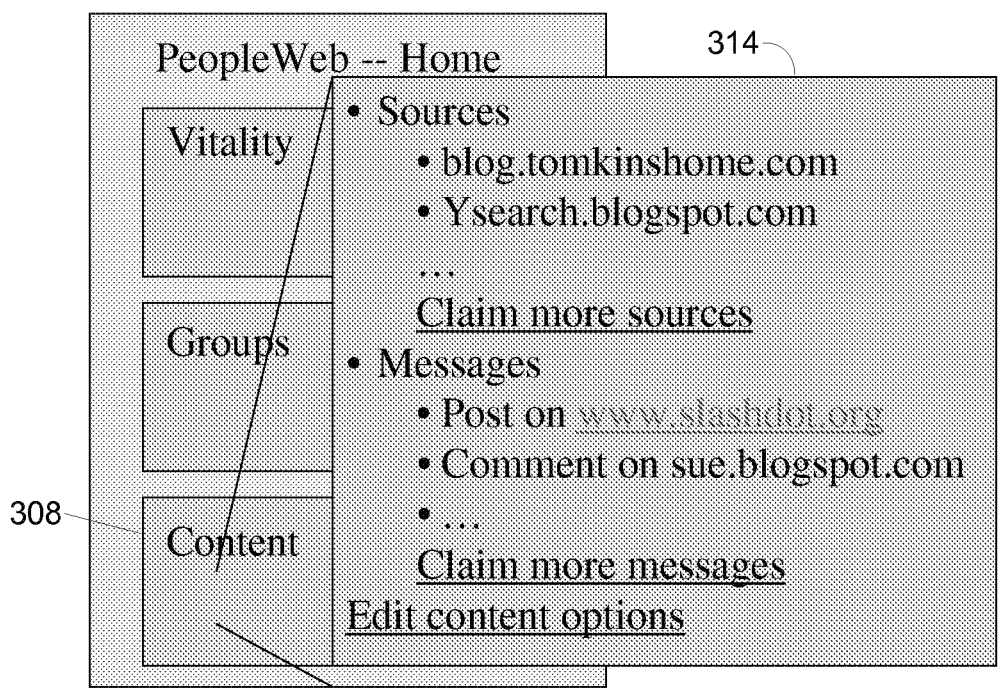

FIG. 3D illustrates a content user interface 314 in accordance with embodiments of the invention. The content user interface 314 is displayed in the content display component 308. The content user interface 314 displays content sources, e.g., network data sources, such as blog sites, news sites, and the like. A user may select the "Claim more sources" option to add additional sources to the user's list of sources. The content user interface 314 also displays messages, which may be generated by other users and sent to groups for delivery to the users who are members of a group.

Figure 4A:
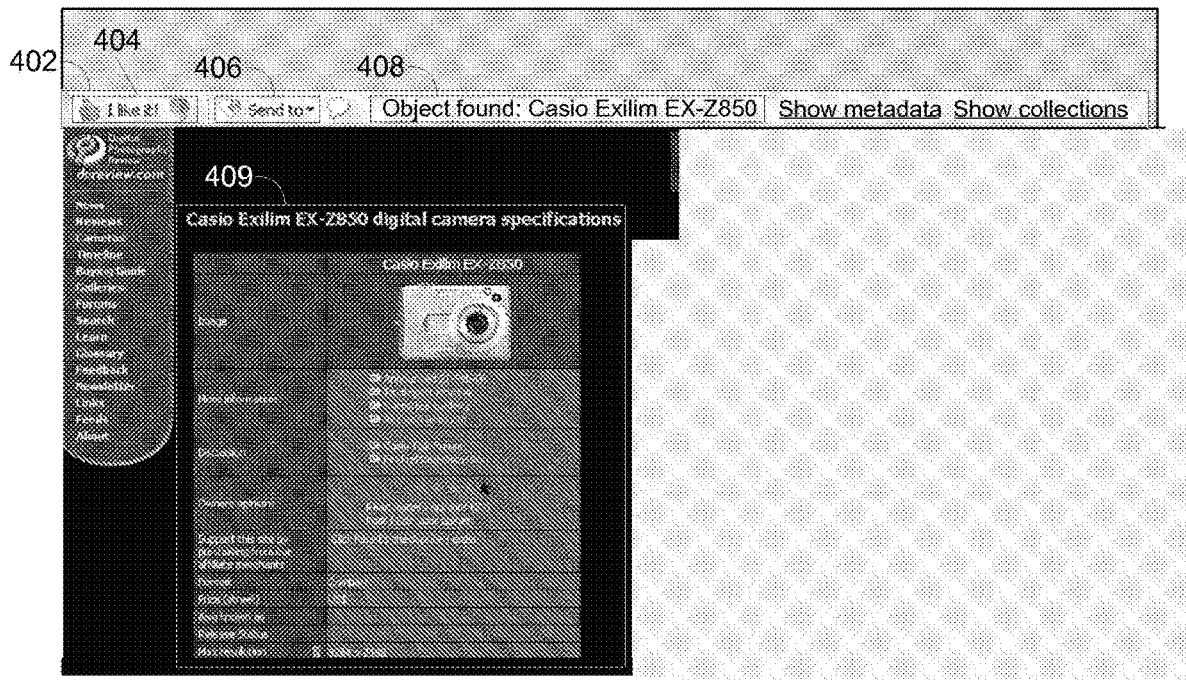
FIGS. 4A-4C illustrate a browser toolbar in accordance with embodiments of the invention.
Figure 4B:
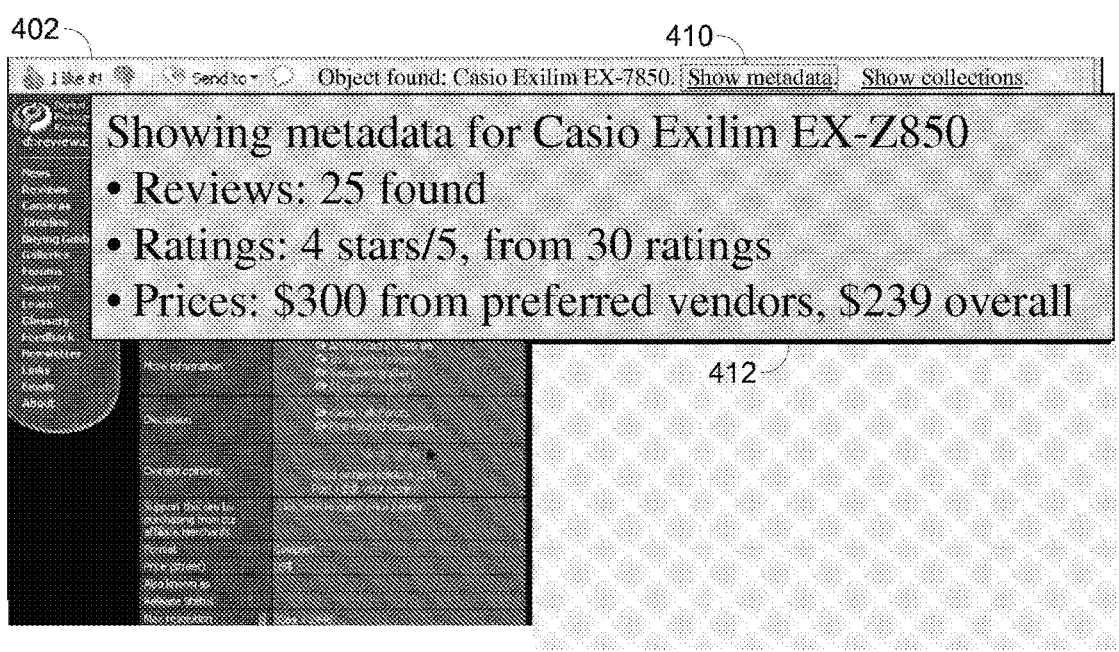
Figure 4C:
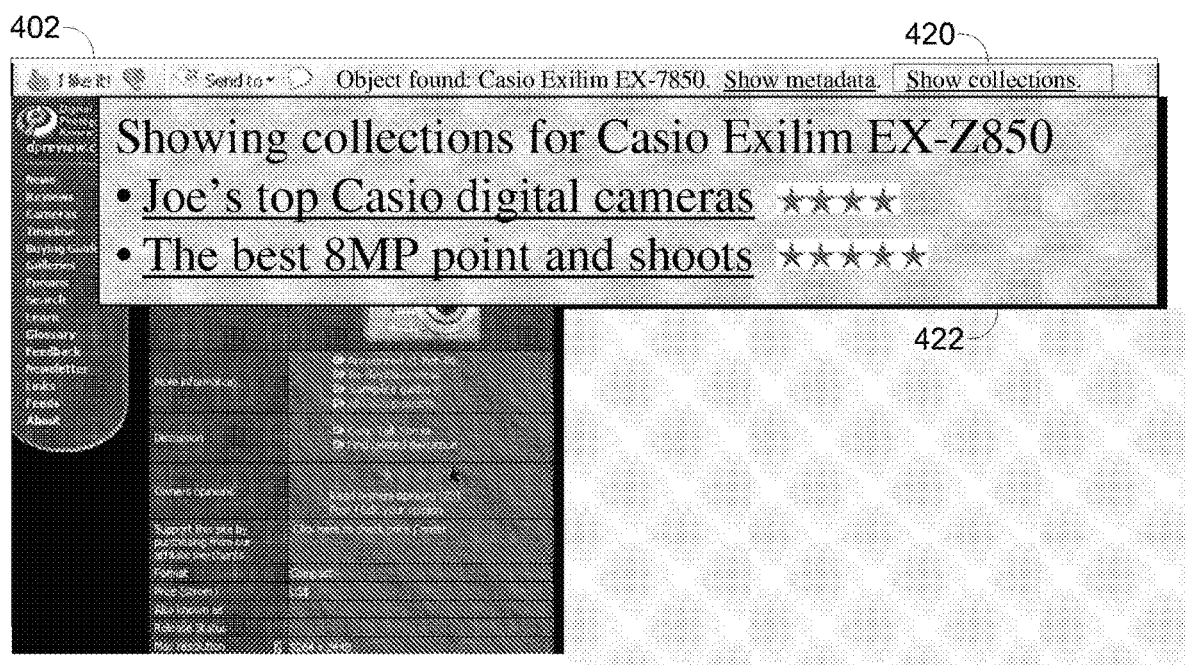

FIGS. 4A-4C illustrate features of a browser toolbar in accordance with embodiments of the invention. FIG. 4A illustrates display of an object by a browser toolbar 402 in accordance with embodiments of the invention. The browser toolbar recognizes the object 409, e.g., a Casio camera in this example, on the web page, by, for example, the presence of the name of the object ("Casio Exlim") in the web page text. Upon recognizing an object, the browser toolbar 402 displays information about the object, including the object name 408, and user interface components that a user may select to view information about the object. The browser toolbar 402 provides features that allow a user to interact with the displayed object 408. These toolbar features include an "I Like It" button 404 with a thumbs up icon and a thumbs down icon, either of which a user may select to indicate that the user likes or dislikes the object, respectively. The user's selection, i.e., like or dislike, may be stored in association with the object in, for example, the object's metadata. The toolbar 402 also includes a "Send to" button 406, which a user may select to send a description of and/or reference to the object 408 in a message, e.g., an e-mail or text message, to another user or group of users. The toolbar displays the name of the object in an "Object found" text area 408, which indicates that the object 408 was found as a result of a search for objects. The toolbar also includes a "Show metadata" feature, which a user may select to display metadata associated with the object 408, as described below with references to FIG. 4B, and a "Show collections" feature, which a user may select to display collections that include the object.

FIG. 4B illustrates display of object metadata by a browser toolbar 402 in accordance with embodiments of the invention. A metadata display 412 is shown in response to user selection of a "Show metadata" button 410 of the toolbar 402. The metadata display 412 shows three items of metadata for an exemplary object named "Casio Exilim." The metadata items include a number of reviews, with the value 25, a summary of ratings, with the value "4 starts/5, from 30 ratings", and a range of prices, with the value "$300 from preferred vendors, $239 overall."

FIG. 4C illustrates display of object collections by a browser toolbar 402 in accordance with embodiments of the invention. A collections display 422 is shown in response to user selection of a "Show collections" button 420 of the toolbar 402. The collections display 422 shows two user-generated list collections that include the Casio Exilim object: a collection named "Joe's top Casio digital cameras", with a 4-star rating, and a collection named "The best 8 MP point and shoots," with a 5-star rating. As is shown, collections may be associated with ratings, which may be shown as stars. The ratings may be generated by the user of the web browser, or by an average of multiple users who have submitted ratings. The user may select one of the collections to view the content of the collections, e.g., the objects that are included in the collection, and any content, e.g., text reviews, associated with the collection.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 5:
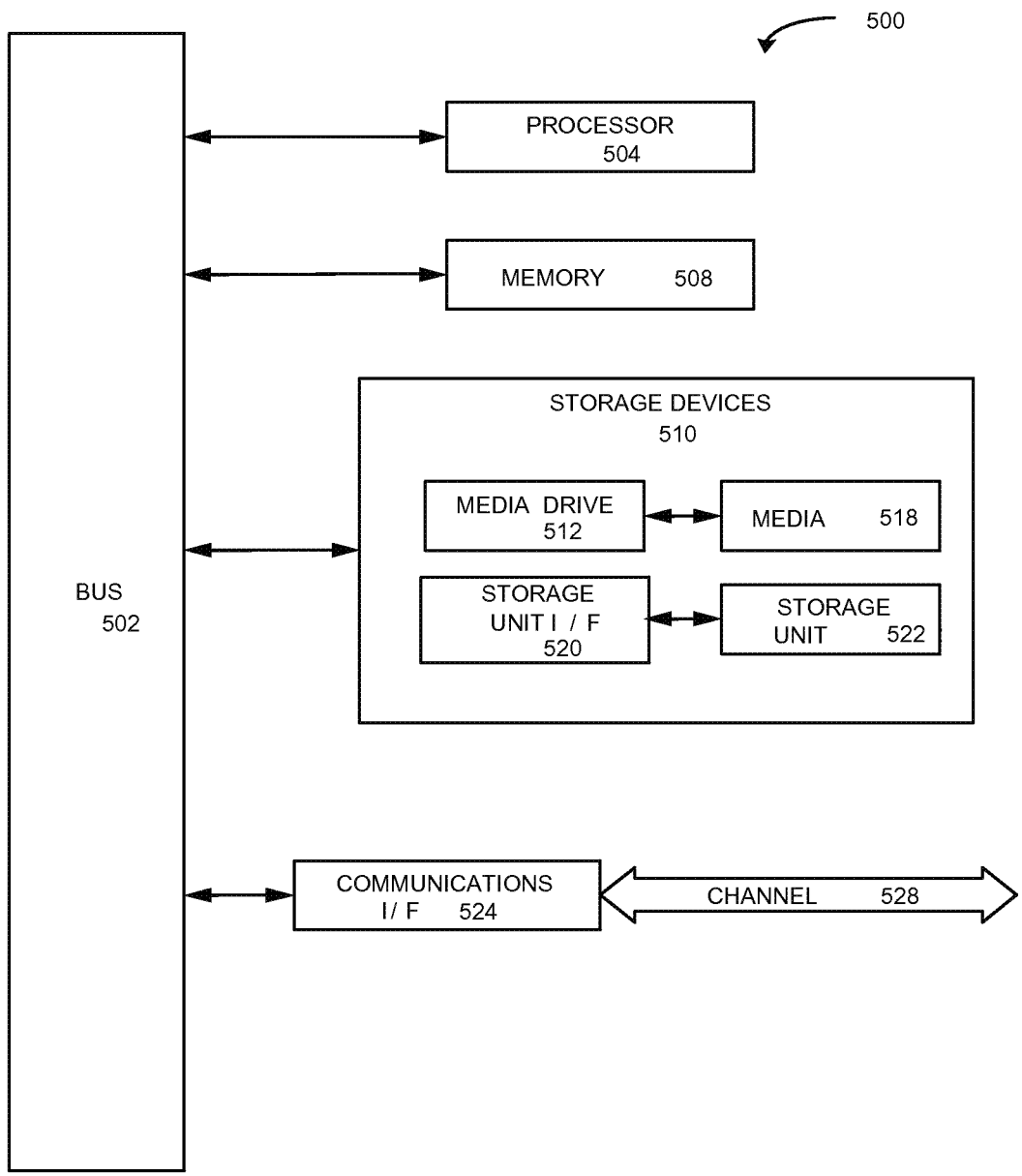
FIG. 5 illustrates an exemplary computer system that may be used in accordance with some embodiments of the invention.

FIG. 5 is an illustrative drawing of an exemplary computer system that may be used in accordance with some embodiments of the invention. FIG. 5 illustrates a typical computing system 500 that may be employed to implement processing functionality in embodiments of the invention. Computing systems of this type may be used in clients and servers, for example. Those skilled in the relevant art will also recognize how to implement the invention using other computer systems or architectures. Computing system 500 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 500 can include one or more processors, such as a processor 504. Processor 504 can be implemented using a general or special purpose processing engine such as, for example, a microprocessor, microcontroller or other control logic. In this example, processor 504 is connected to a bus 502 or other communication medium.

Computing system 500 can also include a main memory 508, such as random access memory (RAM) or other dynamic memory, for storing information and instructions to be executed by processor 504. Main memory 508 also may be used for storing temporary variables or other intermediate information during execution of instructions to be executed by processor 504. Computing system 500 may likewise include a read only memory ("ROM") or other static storage device coupled to bus 502 for storing static information and instructions for processor 504.

The computing system 500 may also include information storage system 510, which may include, for example, a media drive 512 and a removable storage interface 520. The media drive 512 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 518, may include, for example, a hard disk, floppy disk, magnetic tape, optical disk, CD or DVD, or other fixed or removable medium that is read by and written to by a media drive 512. As these examples illustrate, the storage media 518 may include a computer-readable storage medium having stored therein particular computer software or data.

In alternative embodiments, information storage system 510 may include other similar components for allowing computer programs or other instructions or data to be loaded into computing system 500. Such components may include, for example, a removable storage unit 522 and an interface 520, such as a program cartridge and cartridge interface, a removable memory (for example, a flash memory or other removable memory module) and memory slot, and other removable storage units 522 and interfaces 520 that allow software and data to be transferred from the removable storage unit 518 to computing system 500.

Computing system 500 can also include a communications interface 524. Communications interface 524 can be used to allow software and data to be transferred between computing system 500 and external devices. Examples of communications interface 524 can include a modem, a network interface (such as an Ethernet or other NIC card), a communications port (such as for example, a USB port), a PCMCIA slot and card, etc. Software and data transferred via communications interface 524 are in the form of signals which can be electronic, electromagnetic, optical or other signals capable of being received by communications interface 524. These signals are provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 508, storage device 518, or storage unit 522. These and other forms of computer-readable media may be involved in storing one or more instructions for use by processor 504, to cause the processor to perform specified operations. Such instructions, generally referred to as "computer program code" (which may be grouped in the form of computer programs or other groupings), when executed, enable the computing system 500 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 500 using, for example, removable storage drive 514, drive 512 or communications interface 524. The control logic (in this example, software instructions or computer program code), when executed by the processor 504, causes the processor 504 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method comprising:
   receiving, by a processor, a first input from a first user, the first input relating to a request for creation of an object in a computerized social networking environment, the object representing one of a physical object or a virtual object, the computerized social networking environment comprising a user interface (UI), the computerized social networking environment comprising information related to the first user and information related to a second user;
   creating, by the processor in the computerized social networking environment, the object based on the first input, the object comprising metadata and a schema, said metadata comprising information defining one or more attributes of the object, said schema defining a type of said one or more attributes of the object;
   determining, by the processor, that the second user has a relationship with the first user within said computerized social networking environment;
   providing, by the processor, the object to the second user over the computerized social networking environment based on said determination, such that said second user is provided functionality for executing said object in accordance with said object metadata and schema;
   receiving, by the processor, a second input from the second user, the second input defining an additional attribute that extends the metadata and schema of the object;
   updating, by the processor, said object based on said additional attribute provided by said second user, said updating comprising creating a new object that includes the additional attribute, said updating further comprising storing the extended schema as a new schema;
   providing, by the processor, said new object to said first user based on said received second input, such that said a device of the first user is caused to display said new object in accordance with the new schema;
   searching, by the processor, web content for a reference to the object or the new object within web content received by a web browser; and
   causing, by the processor, display of supplemental information in the web browser in response to the reference to the object or the new object being present in the web content, wherein the supplemental information is based upon the metadata associated with the object or the new object, and the supplemental information is associated with the object or the new object in the web browser.

2. The method of claim 1, wherein the reference to the object comprises a name of the object, an identifier associated with the object, or a combination thereof.

3. The method of claim 1, wherein the second user has a relationship with the first user if the second user is a friend of the first user in the social environment.

4. The method of claim 1, wherein the second user has a relationship with the first user if the second user is a friend of a friend of the first user in the social environment.

5. The method of claim 1, wherein the second user has a relationship with the first user if the first user is a member of a group of which the second user is also a member in the social environment.

6. The method of claim 5, wherein the group represents a company, school, family, or interest.

7. The method of claim 1, further comprising:
   upon determination that the second user has the relationship with the first user, causing, by the processor, display of supplemental information in the web browser to the second user, the supplemental information being based upon the metadata associated with the object.

8. The method of claim 1, wherein the metadata further comprises attention data.

9. The method of claim 1, wherein the object is an instance of a corresponding type in a rich system of predefined types, and the object and the metadata are extensible, such that extensions provided by the first user via a first computer are available for use by the second user via a second computer.

10. The method of claim 1, wherein the new schema enabling generation of instances of the new object.

11. An apparatus comprising:
a processor; and
a non-transitory computer-readable storage medium having tangibly stored thereon logic operable for:
receiving a first input from a first user, the first input relating to a request for creation of an object in a computerized social networking environment, the object representing one of a physical object or a virtual object, the computerized social networking environment comprising a user interface (UI), the computerized social networking environment comprising information related to the first user and information related to a second user;
creating, in the computerized social networking environment, the object based on the first input, the object comprising metadata and a schema, said metadata comprising information defining one or more attributes of the object, said schema defining a type of said one or more attributes of the object;
determining that the second user has a relationship with the first user within said computerized social networking environment;
providing the object to the second user over the computerized social networking environment based on said determination, such that said second user is provided functionality for executing said object in accordance with said object metadata and schema;
receiving a second input from the second user, the second input defining an additional attribute that extends the metadata and schema of the object;
updating said object based on said additional attribute provided by said second user, said updating comprising creating a new object that includes the additional attribute, said updating further comprising storing the extended schema as a new schema;
providing said new object to said first user based on said received second input, such that said a device of the first user is caused to display said new object in accordance with the new schema;
searching web content for a reference to the object or the new object within web content received by a web browser; and
causing display of supplemental information in the web browser in response to the reference to the object or the new object being present in the web content, wherein the supplemental information is based upon the metadata associated with the object or the new object, and the supplemental information is associated with the object or the new object in the web browser.

12. The apparatus of claim 11, wherein the reference to the object comprises a name of the object, an identifier associated with the object, or a combination thereof.

13. The apparatus of claim 11, wherein the second user has a relationship with the first user if the second user is a friend of the first user in the social environment.

14. The apparatus of claim 11, wherein the second user has a relationship with the first user if the first user is a member of a group of which the second user is also a member in the social environment.

15. The apparatus of claim 11, wherein the computer readable non-transitory storage medium having stored thereon logic operable for:
upon determination that the second user has the relationship with the first user, causing display of supplemental information in the web browser to the second user, the supplemental information being based upon the metadata associated with the object.

16. The apparatus of claim 11, wherein the metadata further comprises attention data.

17. A non-transitory computer-readable storage medium having tangibly stored thereon program code, that when executed by a processor of a computing device, performs a method comprising:
receiving, by the processor, a first input from a first user, the first input relating to a request for creation of an object in a computerized social networking environment, the object representing one of a physical object or a virtual object, the computerized social networking environment comprising a user interface (UI), the computerized social networking environment comprising information related to the first user and information related to a second user;
creating, by the processor in the computerized social networking environment, the object based on the first input, the object comprising metadata and a schema, said metadata comprising information defining one or more attributes of the object, said schema defining a type of said one or more attributes of the object;
determining, by the processor, that the second user has a relationship with the first user within said computerized social networking environment;
providing, by the processor, the object to the second user over the computerized social networking environment based on said determination, such that said second user is provided functionality for executing said object in accordance with said object metadata and schema;
receiving, by the processor, a second input from the second user, the second input defining an additional attribute that extends the metadata and schema of the object;
updating, by the processor, said object based on said additional attribute provided by said second user, said updating comprising creating a new object that includes the additional attribute, said updating further comprising storing the extended schema as a new schema;
providing, by the processor, said new object to said first user based on said received second input, such that said a device of the first user is caused to display said object or the new object in accordance with the new schema;
searching, by the processor, web content for a reference to the object within web content received by a web browser; and
causing, by the processor, display of supplemental information in the web browser in response to the reference to the object or the new object being present in the web content, wherein the supplemental information is based upon the metadata associated with the object or the new object, and the supplemental information is associated with the object or the new object in the web browser.

* * * * *